CHARLES F. CHEW.

Improvement in Cart-Body Catch.

No. 125,935.  Patented April 23, 1872.

Witnesses:
Francis McArdle
Geo. W. Mabee

Inventor:
Chas. Francis Chew.
per
Attorneys.

ated 125,935

UNITED STATES PATENT OFFICE.

CHARLES F. CHEW, OF SWEDESBOROUGH, NEW JERSEY.

IMPROVEMENT IN CART-BODY CATCHES.

Specification forming part of Letters Patent No. 125,935, dated April 23, 1872.

Specification describing a new and Improved Cart-Body Catch, invented by CHARLES FRANCIS CHEW, of Swedesborough, in the county of Gloucester and State of New Jersey.

Figure 1:
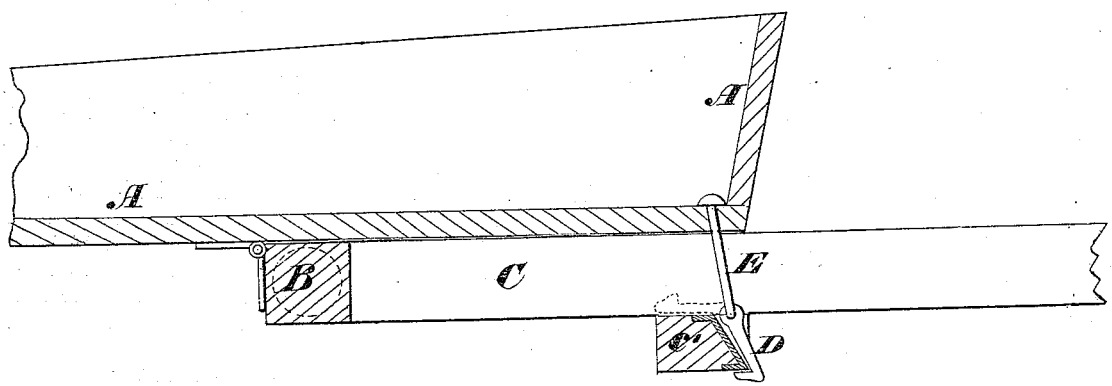
Figure 2:
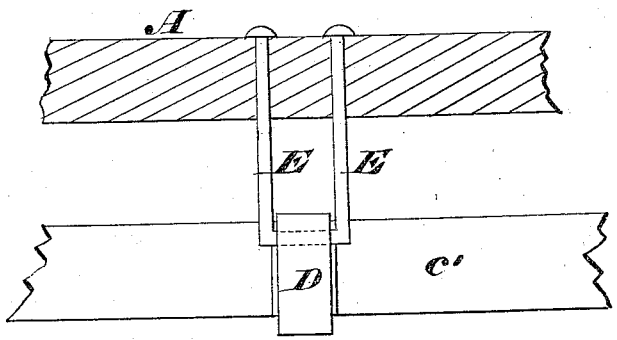

Figure 1 is a side view of my improved cart-body catch, showing it as applied to a cart-body. Fig. 2 is a front view of the same.

Similar letters of reference indicate corresponding parts.

My invention has for its object to furnish an improved catch or fastening for securing cart-bodies, which shall be simple in construction, inexpensive, strong, durable, not liable to get out of order nor to become accidentally unfastened, and which will fasten itself when the cart-body is lowered into place; and it consists in the catch or fastener, constructed and operating in connection with the body and shafts of a cart, as hereinafter more fully described.

A represents a cart-body, which is hinged to the axle B in the ordinary manner. C are the shafts, which are rigidly and securely attached to the axle B, and which are connected at the forward end of the cart-body A by a cross-bar, $c'$. The forward side of the cross-bar $c'$ is beveled off, as shown in Fig. 1, which bevel should be faced with metal to prevent wear. D is a hook, which should be about equal in length to the thickness of the cross-bar $c'$. The upper end or eye of the hook D is pivoted to a long staple, E, which is securely attached to the forward end of the cart-body A, and which should be of such a length that the loop to which the hook D is pivoted may be at or near the top of the cross-bar $c'$, as shown in Figs. 1 and 2.

With this construction the cart-body is unfastened by turning the hook D over through the staple E so as to lie upon its back upon the top of the cross-bar $c'$, as shown in dotted lines in Fig. 1. As the cart-body is tipped the hook D hangs down vertically. As the cart-body is again lowered the end of the hook D strikes upon and slides down the inclined side of the cross-bar $c'$ and catches upon the lower side of said cross-bar $c'$, as shown in Fig. 1.

The end or point of the hook D should be rounded off so that it may operate properly in whatever position the cart may be, and which would not be the case were the point of the hook simply beveled.

Having thus described my invention, I claim as new and desire to secure by Letters Patent—

The cart-body catch or fastener, formed by the combination of the hook D and long staple E with the cart-body A, shafts C, and beveled cross-bar $c'$, said parts D E being constructed and operating substantially as herein shown and described, and for the purpose set forth.

CHARLES FRANCIS CHEW.

Witnesses:
AMOS LIPPINCOTT,
JOHN P. CHEESMAN.